United States Patent [19]
Anderson et al.

[11] 3,873,438
[45] Mar. 25, 1975

[54] ELECTROLYTIC CELL ASSEMBLY INCLUDING BIPOLAR CONCENTRIC ELECTRODES

[75] Inventors: Edward P. Anderson, Fond Du Lac, Wis.; Thomas J. Lamb, Mendham, N.J.

[73] Assignee: Engelhard Minerals & Chemicals Corporation, Murray Hill, N.J.

[22] Filed: May 7, 1973

[21] Appl. No.: 357,555

Related U.S. Application Data

[63] Continuation-in-part of Ser. Nos. 178,685, Sept. 8, 1971, abandoned, and Ser. No. 236,357, March 20, 1972, abandoned.

[52] U.S. Cl................. 204/268, 204/95, 204/270, 204/272
[51] Int. Cl.............................................. B01k 3/00
[58] Field of Search ............. 204/95, 268, 270, 272

[56] References Cited
UNITED STATES PATENTS
3,076,754   2/1963   Evans............................. 204/268 X
3,471,375   10/1969  Cooke et al. ........................ 204/28

Primary Examiner—John H. Mack
Assistant Examiner—W. I. Solomon

[57] ABSTRACT

A cylindrical anode and a cylindrical cathode longitudinally spaced from one another with an insulating cylinder between them form one wall of an annular flow passage. The other wall is formed by a coaxial conducting cylinder which is known as a bi-polar electrode because in operation it is anodic relative to the cathode and cathodic relative to the anode. In one embodiment the two electrodes and insulating spacer form the housing within which is mounted the bi-polar electrode. In another embodiment the bi-polar electrode forms the housing within which is mounted the cylindrical anode, insulating spacer and cathode. The electrolyte, such as brine, flows through the annular flow passage while current flows from anode through electrolyte to the bi-polar electrode along the bi-polar electrode back through the electrolyte to the cathode thereby, when the electrolyte is brine, generating sodium hypochlorite.

22 Claims, 4 Drawing Figures

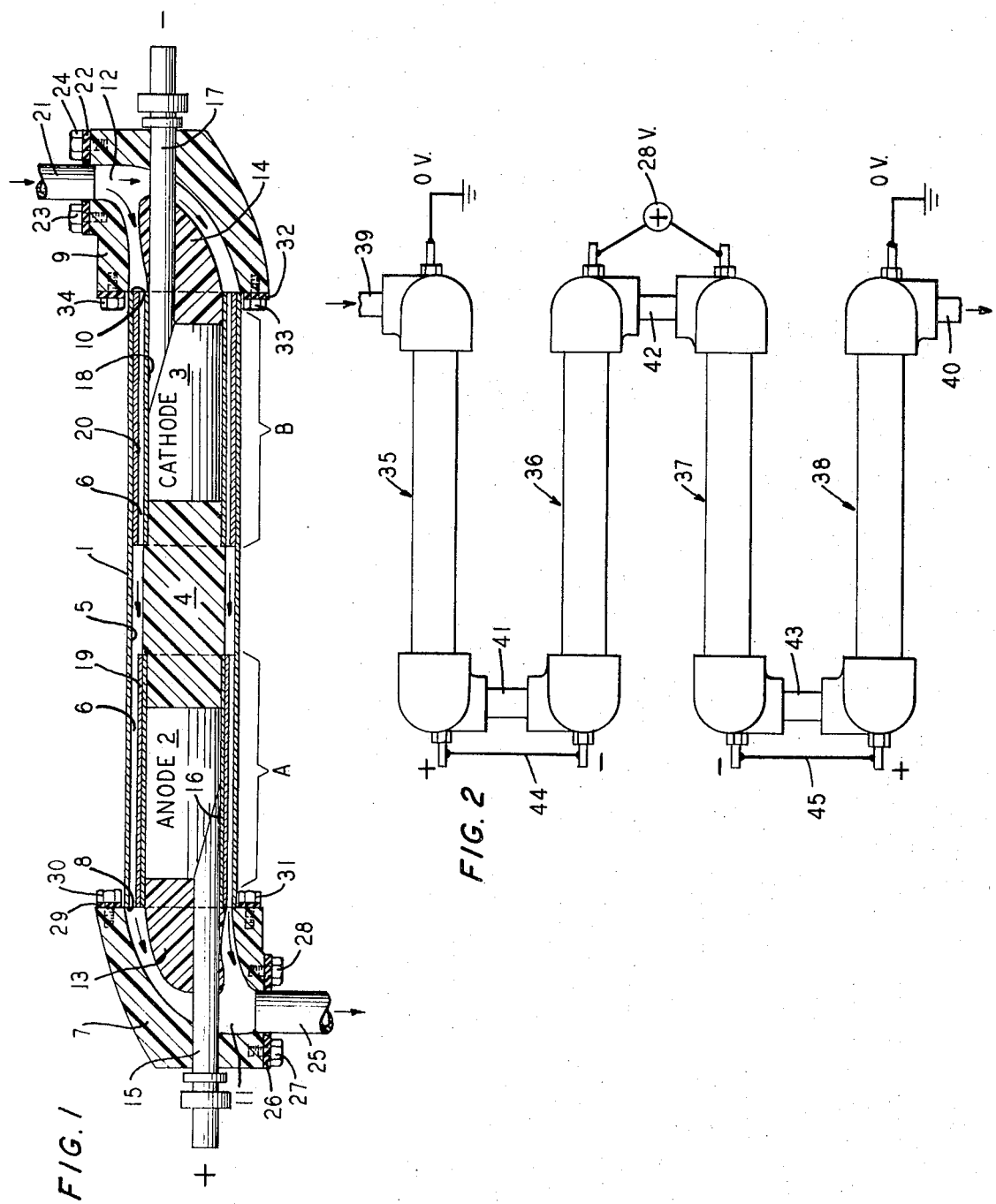

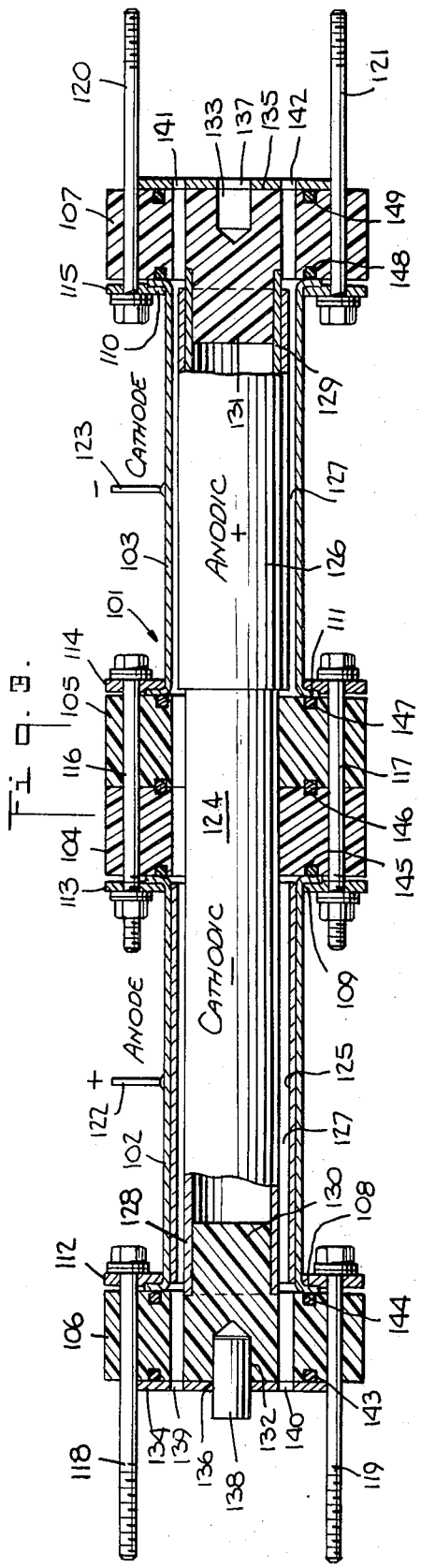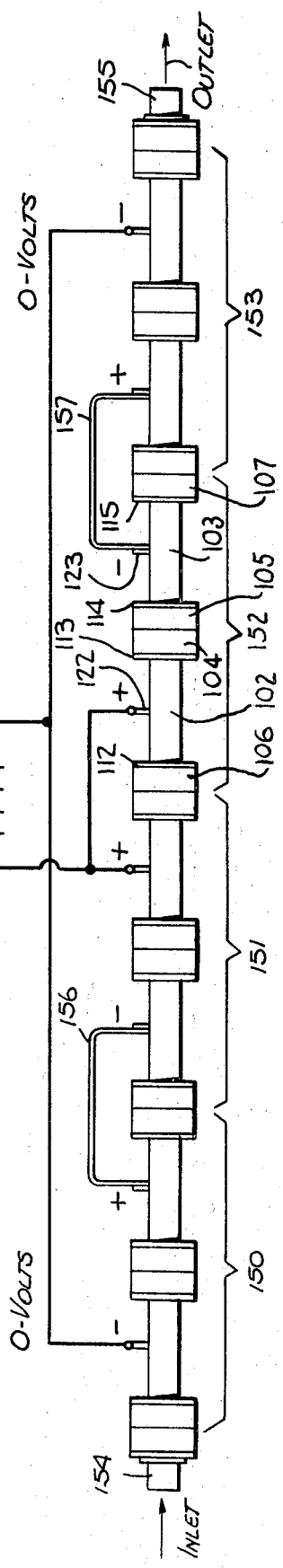

3,873,438

ELECTROLYTIC CELL ASSEMBLY INCLUDING BIPOLAR CONCENTRIC ELECTRODES

REFERENCE TO RELATED APPLICATIONS

This application is a continuation-in-part of patent applications Ser. No. 178,685 filed on Sept. 8, 1971 now abandoned and Ser. No. 236,357 filed on Mar. 20, 1972 now abandoned, both entitled Electrolytic Cell Assembly.

BACKGROUND OF THE INVENTION

Algae, slime and runaway bacteria concentrations often plague water storage or supply systems such as sewage systems, cooling tower complexes, potable water supplies, systems for fire prevention, irrigation, etc. Ocean water storage or supply systems will foul with algae, slime and numerous additional organisms such as barnacles, tunicates, hydroids, bryozoa and others. The proliferation of these organisms is prevented by the application of chlorine. Chlorine gas, although economical, is risky to store and use. Anhydrous liquid chlorine is also risky to store and to use and has a high thermal coefficient of expansion so that even moderate elevation in temperature could cause hydrostatic rupture of a container tank.

Sodium hypochlorite is the alternative form of chlorine that comes closest to being economically feasible as a chlorinating agent. Although the relative safety of sodium hypochlorite is well known, it still presents storage problems because of the large quantities that must be used. The solution to the storage and safety problem is to use a system that can produce sodium hypochlorite as needed with no storage required.

Accordingly, the major purpose of this invention is to provide a generator mechanism adapted to produce sodium hypochlorite on demand in whatever quantities are required.

BRIEF DESCRIPTION OF THE INVENTION

In brief, the electrolytic cell assembly of this invention includes first and second cylindrical electrodes longitudinally spaced from one another and insulated from one another by a cylindrical insulating spacer positioned between the two electrodes. One of these two electrodes operates as an anode and one as a cathode. Coaxial of the electrodes and spaced from the electrodes is an electrically conductive cylindrical member. Thus, between the electrically conductive cylindrical member and the two cylindrical electrodes there is an annular space through which electrolyte flows.

In one embodiment of the invention, the electrodes and the spacer between the electrodes form a housing in which the conductive cylindrical member is coaxially positioned. In another embodiment of the invention, the conductive cylindrical member forms the housing within which the two electrodes and the spacer are contained and coaxially positioned.

In both embodiments, the cylindrical electrically conductive member when in operation, is anodic with respect to the cathode which it faces across the annular flow passage and is cathodic with respect to the anode which it faces across the annular flow passage. Accordingly, in both embodiments, this cylindrical electrically conductive member has a bi-polar function.

In both embodiments, these assemblies can be connected in end-to-end relationship to provide a bank of cell assemblies. When so mechanically connected, they are preferably arrayed in an electrical series-parallel fashion so that the net voltage drop across the bank is zero and thus the two ends of the bank can be held at ground potential to avoid corrosive circulating currents in the system to which the bank is connected.

BRIEF DESCRIPTION OF THE DRAWINGS

FIG. 1 illustrates a partly cross-sectional and partly elevational side view of a first embodiment of the electrolytic cell of this invention.

FIG. 2 illustrates a schematic view of a conduit system incorporating a plurality of the FIG. 1 electrolytic cells.

FIG. 3 illustrates a partly cross-sectional and partly elevational view of a second embodiment of the electrolytic cell of this invention.

FIG. 4 illustrates a schematic view of a conduit system incorporating a plurality of the FIG. 3 electrolytic cells.

DESCRIPTION OF THE PREFERRED EMBODIMENTS

Referring to FIG. 1, the electrolytic cell assembly comprises an electrically conductive elongated tubular housing 1 composed of, for example, titanium. Within and coaxial of the housing 1 is a pair of electrodes 2 and 3 of tubular structure and composed of titanium or other suitable material. The electrodes are insulatingly spaced from each other longitudinally of the housing by means of an insulation spacer 4 mounted therebetween. As illustrated, the spacer 4 is a cylindrical member having one end portion telescopically mounted in an end portion of electrode 2 and the other end portion likewise mounted in an adjacent end portion of electrode 3. The electrodes 2 and 3 and spacer 4 are spaced relative to the inner wall 5 of the housing 1 to provide an electrolyte flow passage 6 therebetween.

A cap member 7 is insulatingly mounted on and covers one end 8 of the housing 1 and another cap member 9 is insulatingly mounted on and covers the other end 10 of the housing 1. The caps are preferably composed of insulating material such as a methyl methacrylate polymer (Plexiglas), a fiberglass reinforced polyester resin, an acrylic resin or an epoxy resin. Each cap 7 and 9 is provided with an electrolyte flow channel 11 and 12, respectively, therethrough communicating with the flow passage 6. The ends of the tubular electrodes 2 and 3 remote from the spacer means 4 are each closed by a closure plug 13 and 14, respectively, which extends outwardly of each electrode as a tongue streamline to direct a flow of electrolyte through the channels and the electrolyte passage 6.

One of the caps 7 has a positive electrical lead or conductor 15 passing through the cap into the channel 11, through the plug 13 and into contact with the anode electrode 2 to which it is welded as at 16. The other cap 9 has a negative electrical conductor lead 17 passing through the cap into channel 12, through the plug 14 and into contact with the cathode electrode 3 to which it is welded as at 18. The outer surface of the anode electrode 2 is provided with a platinum group metal coating 19, e.g., platinum, rhodium, iridium, preferably platinum. The inner wall 5 of the housing 1 is provided with a platinum group metal coating 20, preferably platinum, on a portion thereof adjacent the cathode 3. However, the entire surface of inner wall 5 and the outer surfaces of both anode 2 and cathode 3 may be coated with a platinum group metal. In the drawings, the coatings 19 and 20 are shown in exagerated thickness but, as is known in the art, these coatings are too thin to materially affect the width of the flow passage 6.

An inlet conduit 21 is connected to the cap 9 in communication with the channel 12 by means of a gasket 22 which is secured to the cap 9 by bolts 23 and 24. An outlet conduit 25 is connected to the cap 7 in communication with the channel 11 by means of a gasket 26 which is secured to the cap 7 by bolts 27 and 28. The cap 7 is connected to one end 8 of the housing 1 by means of a gasket 29 which is secured to the cap 7 by bolts 30 and 31. The cap 9 is connected to another end 10 of the housing 1 by means of a gasket 32 which is secured to the cap 9 by bolts 33 and 34.

In operation, a sodium chloride solution electrolyte, e.g., sea water or a brine solution, is passed through the electrolytic cell assembly while the assembly is electrically energized through conductor leads 15 and 17. The D.C. electrical current passes from anode 2, through the electrolyte in passage 6, to portion A of the housing 1 adjacent the anode 2. There is a voltage drop between anode 2 and portion A of the housing 1 with portion A being cathodic to anode 2. However, because of the negative potential impressed on cathode 3 by lead 17, current flows along the entire length of housing 1. At portion B of the housing, current flows from the coating 20 through the electrolyte in passage 6 to the cathode 3. Since the cathode 3 is more negative than portion B, because of a voltage drop between portion B and cathode 3, the portion B is anodic to cathode 3. With this arrangement and because of the substantially bi-polar nature of the housing 1, current is permitted to pass from anode 2 to portion A and from portion B to cathode 3 without the use of any electrical wiring within the cell assembly.

FIG. 2 illustrates a schematic view of a conduit system incorporating a plurality of the FIG. 1 electrolytic cell assemblies. In this arrangement a plurality of cell assemblies 35, 36, 37, 38, each constructed according to FIG. 1, are connected together to provide a conduit system having an inlet 39 and an outlet 40. The electrolyte passes from inlet 39 into assembly 35 and then into assembly 36, by means of connecting tube 41 into and through assembly 37 by means of connecting tube 42 and through assembly 38 by means of connecting tube 43 and then out of the system by means of outlet 40.

It will be noted from FIG. 1 that each assembly comprises a pair of electrolytic cells in series with each other, i.e., anode 2 and portion A of housing 1 being one cell and cathode 3 and portion B of housing 1 being the other cell. This double cell unit is fully activated with, e.g., 14 volts D.C., to impose 7 volts on each one of the pair of cells. Two of these double cell units 35 and 36 are electrically connected by lead 44 in series and therefore there is a total of four electrolytic cells each demanding 7 volts so that a total of 28 volts must be impressed across the series connected units 35 and 36. There is provided another pair of identical assemblies 37 and 38 electrically connected by series lead 45.

In order to maintain both inlet and outlet ends of a battery of chlorine producing electrolytic cells at ground potential, e.g., 0 volts, the two pairs of such series connected units are connected in parallel, e.g., series assemblies 37 and 38, so that the series-parallel circuit can be powered by a common source of 28 volts.

When the center tap of this battery of cells is held at 28 volts positive potential, both the inlet 39 and outlet 40 for the electrolyte can be held at ground potential. This minimizes corrosion damage and protects against electrical shock or fire hazard. The voltage applied to the system depends upon the characteristic voltage drop in each assembly and has a value such that the inlet and outlet of the system are at zero potential.

A Second Embodiment

Referring to FIG. 3, the electrolytic cell assembly comprises an electrically conductive elongated tubular sleeve 101 formed of a pair of tubular electrodes 102 and 103 insulatingly spaced from each other in end-to-end relationship by insulation spacing rings 104 and 105 mounted coaxially on the sleeve 101. The rings 104 and 105 are composed of insulation material such as a methyl methacrylate polymer (Plexiglas), a fiberglass reinforced polyester resin, an acrylic resin or an epoxy resin. Similar or identical insulation spacing rings 106 and 107 are mounted one each on opposite ends of the sleeve 101. The tubular electrodes 102 and 103 are composed of, for example, titanium with electrode 102 mounted between spacer rings 104 and 106 and electrode 103 mounted between spacer rings 105 and 107. Tubular electrode 102 is provided with flanges 108 and 109 at opposite ends thereof and tubular electrode 102 is provided with flanges 110 and 111 at opposite ends thereof. A retaining washer 112 secures the flange 108 in abutment with spacer ring 106. Flange 109 is secured in abutment with spacer ring 104 by means of retaining washer 113. Flange 111 is similarly secured to spacer ring 105 by retaining washer 114 and flange 110 is likewise secured to spacer ring 107 by retaining washer 115. The tubular electrodes 102 and 103 are secured in end-to-end relationship by bolts 116 and 117 passing through a pair of adjacent spacer rings 104 and 105.

While FIG. 3 illustrates a single composite electrolytic cell assembly, it will be apparent that a plurality of cell assemblies 101 can be mounted and secured to each other by bolting spacer ring 106 to a spacer ring of another cell assembly by means of bolts 118 and 119 shown associated with spacer ring 106 and by bolting spacer ring 107 to still another cell assembly by means of bolts 120 and 121 shown associated with spacer ring 107, to provide a plurality of cell assemblies in end-to-end relationship as schematically illustrated by FIG. 4.

Each of the tubular electrodes 102 and 103 is provided with an electrical input lead 122 and 123, respectively. The tubular sleeve 101, comprising electrodes 102 and 103 contains concentrically and substantially co-extensive therewith an inner bi-polar tubular electrode 124 composed preferably of titanium. The inner surface of the sleeve electrode 102 which performs as an anode is lined with a layer 125 of a platinum group metal, preferably platinum. An outer surface of the bi-polar electrode 124, which performs anodically relative to sleeve electrode 103, is coated with a layer of a platinum group metal 126, preferably platinum, over an area adjacent the sleeve electrode 103, the electrode 103 performing as a cathode. These coatings 125 and 126 are shown in exagerated thickness in the drawings but, as is known in the art, the actual thickness of these coatings is insufficient to materially affect the width of the flow passage 127.

The bi-polar electrode 124 is spaced relative to the inner wall of the sleeve 101, including anode electrode 102, cathode electrode 103 and spacer rings 104 and 105, to provide an annular flow electrolyte flow passage 127 therebetween. Opposite end portions 128 and 129 of the tubular bi-polar electrode 124 are each provided with insulation plugs 130 and 131, respectively. The plugs extend inwardly and outwardly of the end portions of the electrode 124. The portions of the plugs 130 and 131 which extend outwardly of the electrode 124 are each provided, respectively, with a central bore cavity 132 and 133 directed inwardly of the tubular bi-polar electrode. Guide rings 134 and 135 are mounted at opposite ends of the electrolytic cell assembly 101 each adjacent one of the spacer rings 106 and 107. The guide rings 134 and 135 are each provided, respectively, with a central aperture 136 and 137 communicating with bore cavities 132 and 133, respectively. A dowel means 138 is mounted through guide ring aperture 136 and extends into bore cavity 132 with an opposite end portion thereof extending outwardly of the guide ring aperture 136. An identical dowel means (not shown) is mounted through guide ring aperture 137 and is seated in bore cavity 133 of insulating plug 131. Guide ring 134 is provided with a plurality of circumferentially spaced slots 139 and 140 communicating with electrolyte flow passage 127, and guide ring 135 is provided with a plurality of circumferentially spaced slots 141 and 142 communicating with electrolyte flow passage 127.

The purpose of the plug bores, guide ring and dowel combination is to maintain the bi-polar electrode 124 and tubular sleeve 101 electrodes 102 and 103 in concentric spaced relationship. The passage of an electrolyte through the cell assembly of FIG. 1 is sealed against leakage by means of O-rings 143, 144, 145, 146, 147, 148 and 149, as illustrated. It will be apparent from FIG. 3, that by means of spacer rings 106 and 107, and the plug bore, guide ring and dowel combination, that a plurality of cell assemblied can be assembled in end-to-end relationship as illustrated in FIG. 4.

In operation, a sodium chloride electrolyte, e.g., sea water or a brine solution, is passed through electrolyte passage 127 while the assembly is electrically energized through input leads 122 and 123. The DC electrical current passes from tubular anode 102 through the platinum lining 125, through the electrolyte in passage 127 to a portion of the bi-polar electrode 124 adjacent the anode 102. There is a voltage drop between anode 102 and the portion of the bi-polar electrode adjacent the anode 102 with such portion of the bi-polar electrode being cathodic to anode 102. However, because of the potential impressed on bi-polar electrode 124 adjacent the anode 102, current flows along the entire length of electrode 124. At the portion of electrode 124 adjacent the tubular cathode 103, current flows from the platinum coating 126 through the electrolyte in passage 127 to the tubular cathode 103, and since, due to voltage drop, the cathode 103 is more negative than that portion of the bi-polar electrode adjacent cathode 103 is anodic to cathode 103. With this arrangement and because of the bi-polar nature of the electrode 124, current is permitted to pass from anode 102 through electrode 124 and to cathode 103 without the use of any electrical wiring within the cell assembly.

FIG. 4 illustrates a schematic view of a conduit system incorporating a plurality of the FIG. 3 electrolytic cell assemblies in end-to-end relationship.

In this arrangement a plurality of cell assemblies 150, 151, 152 and 153, each constructed according to FIG. 3, are connected together in end-to-end relationship to provide a conduit system having an inlet 154 and an outlet 155.

It will be noted from FIG. 3 that each cell assembly comprises a pair of electrolytic cells in series with each other, i.e., anode 102 and an adjacent portion of electrode 124 being one cell and cathode 103 and a portion of electrode 124 adjacent to cathod 103 being the other cell. This double cell unit is fully activated with, e.g., 14 volt DC to impose 7 volts on each one of the pair of cells. Two of these double cell units 150 and 151 are connected by lead 156 in series and therefore there is a total of four electrolytic cells each demanding 7 volts so that a total of 28 volts must be impressed across the series connected units 150 and 151. There is provided another pair of identical assemblies 152 and 153 in the end-to-end relationship of FIG. 4. The assemblies 152 and 153 are electrically connected in series by lead 157.

In order to maintain both inlet and outlet ends 154 and 155 of the battery of electrolytic cells at ground potential, e.g., 0 volts, the two pairs of such series connected units are electrically connected in parallel, e.g., series connected assemblies 150 and 151 are connected in parallel with series connected assemblied 152 and 153, so that the series parallel circuit can be powered by a common source 158 of 28 volts. When the center of this battery of units is held at 28 volts positive potential, both inlet and outlet 154 and 155 for the electrolyte can be held at ground potential. This minimizes corrosion damage and protects against electrical shock or fire hazard. The voltage applied to the system depends upon the characteristic voltage drop in each assembly unit and has a value such that the inlet and outlet of the system are at zero potential.

What is claimed is:

1. An electrolytic cell assembly adapted to produce hypochlorites comprising:
   an anode having a first cylindrical surface and a cathode having a second cylindrical surface, said electrodes being substantially coaxial with one another and axially spaced from one another,
   a bi-polar electrode having a third cylindrical surface, said third surface being concentrically spaced from said first and second surfaces, said third surface being substantially coaxial with said first and second surfaces,
   said bi-polar electrode being stationary relative to said anode and said cathode,
   a flow channel defined on one side by said third surface and on the other side by said first and second surfaces,
   the sole electrical coupling between said bi-polar electrode on the one hand and said anode and cathode on the other hand being whatever electrolyte is contained within said flow channel.

2. The electrolytic cell assembly of claim 1 wherein said flow channel is annular.

3. The electrolytic cell assembly of claim 2 wherein said first, second and third cylindrical surfaces are all substantially circular in cross-section.

4. The electrolytic cell assembly of claim 1 wherein said first, second and third cylindrical surfaces are all substantially circular in cross-section.

5. The electrolytic cell assembly of claim 1 further comprising:
an insulating member between said anode and said cathode, said insulating member having a cylindrical surface flush with said first and second cylindrical surfaces, said cylindrical surfaces of said anode, said insulating member and said cathode providing a substantially continuous smooth cylindrical surface spaced from said cylindrical surface of said bi-polar electrode, said flow channel being solely defined by two smooth substantially continuous concentric cylindrical surfaces.

6. The electrolytic cell assembly of claim 5 wherein said flow channel is annular.

7. The electrolytic cell assembly of claim 6 wherein said first, second and third cylindrical surfaces and said surface of said insulating member are all substantially circular in cross-section.

8. The electrolytic cell assembly of claim 5 wherein said first, second and third cylindrical surfaces and said surface of said insulating member are all substantially circular in cross-section.

9. The electrolytic cell assembly of claim 5 wherein:
said bi-polar electrode is tubular, and
said anode, said cathode and said insulating member are all positioned within said bi-polar electrode.

10. The electrolytic cell assembly of claim 9 wherein:
said first, second and third cylindrical surfaces and said surface of said insulating member are all substantially circular in cross-section, and
said flow channel is annular.

11. The electrolytic cell assembly of claim 9, further comprising:
inlet means for supplying aqueous chloride electrolyte to said flow channel,
outlet means for removing treated electrolyte from said flow channel, said treated electrolyte containing hypochlorite produced by electrolytic action on said electrolyte between said bi-polar electrode and each of said anode and said cathode, and
electrical conductor means for applying a DC potential across said anode and cathode.

12. A bank of electrolytic cell assemblies comprising:
first, second, third and fourth electrolytic cell assemblies as set forth in claim 9,
said electrolytic cell assemblies being connected in mechanical series to provide a plurality of flow passages in series through which electrolyte will flow in sequence,
said cathodes of said first and second cell assemblies being upstream from the corresponding ones of said anodes,
said cathodes of said third and fourth cell assemblies being downstream from the corresponding ones of said anodes,
said anode of said first cell being electrically connected to said cathode of said second cell,
said anode of said fourth cell being electrically connected to said cathode of said third cell,
a source of DC electricity, said source having a positive terminal and a negative terminal, said positive terminal connected to said anodes of said second and third cells, said negative terminal connected to the cathodes of said first and fourth cells.

13. The electrolytic cell assembly of claim 5 wherein:
said anode, said insulating member and said cathode are all tubular, and
said bi-polar electrode is positioned within said anode, cathode and insulating member.

14. The electrolytic cell assembly of claim 13 wherein:
said first, second and third cylindrical surfaces and said surface of said insulating member are all substantially circular in cross-section, and
said flow channel is annular.

15. The electrolytic cell assembly of claim 13, further comprising:
inlet means for supplying aqueous chloride electrolyte to said flow channel,
outlet means for removing treated electrolyte from said flow channel, said treated electrolyte containing hypochlorite produced by electrolytic action on said electrolyte between said bi-polar electrode and each of said anode and said cathode, and
electrical conductor means for applying DC potential across said anode and cathode.

16. A bank of electrolytic cell assemblies comprising:
first, second, third and fourth electrolytic cell assemblies as set forth in claim 13,
said electrolytic cell assemblies being connected in mechanical series to provide a plurality of flow passages in series through which electrolyte will flow in sequence,
said cathodes of said first and second cell assemblies being upstream from the corresponding ones of said anodes,
said cathodes of said third and fourth cell assemblies being downstream from the corresponding ones of said anodes,
said anode of said first cell being electrically connected to said cathode of said second cell,
said anode of said fourth cell being electrically connected to said cathode of said third cell,
a source of DC electricity, said source having a positive terminal and a negative terminal, said positive terminal connected to said anodes of said second and third cells, said negative terminal connected to the cathodes of said first and fourth cells.

17. A bank of electrolytic cell assemblies comprising:
first, second, third and fourth electrolytic cell assemblies as set forth in claim 5,
said electrolytic cell assemblies being connected in mechanical series to provide a plurality of flow passages in series through which electrolyte will flow in sequence,
said cathode of said first and second cell assemblies being upstream from the corresponding ones of said anodes,
said cathodes of said third and fourth cell assemblies being downstream from the corresponding ones of said anodes,
said anode of said first cell being electrically connected to said cathode of said second cell,
said anode of said fourth cell being electrically connected to said cathode of said third cell,
a source of DC electricity, said source having a positive terminal and a negative terminal, said positive terminal connected to said anodes of said second and third cells, said negative terminal connected to the cathodes of said first and fourth cells.

18. The electrolytic cell assembly of claim 5, further comprising:
inlet means for supplying aqueous chloride electrolyte to said flow channel, outlet means for removing treated electrolyte from said flow channel, said treated electrolyte containing hypochlorite produced by electrolytic action on said electrolyte between said bi-polar electrode and each of said anode and said cathode, and electrical conductor means for applying a DC potential across said anode and cathode.

19. The electrolytic cell assembly of claim 1 wherein:

said bi-polar electrode is tubular, and said anode and said cathode are positioned within said bi-polar electrode.

20. The electrolyte cell assembly of claim 19 wherein:

said first, second and third cylindrical surfaces are all substantially circular in cross-section, and said flow channel is annular.

21. The electrolytic cell assembly of claim 1 wherein:

said anode and cathode are tubular, and said bi-polar electrode is positioned within said anode and cathode.

22. The electrolytic cell assembly of claim 21 wherein:

said first, second and third cylindrical surfaces are all substantially circular in cross-section and said flow channel is annular.

* * * * *